Aug. 9, 1932.  J. MUHLHAUSER ET AL  1,871,421
HIGH PRESSURE COUPLER
Filed Dec. 7, 1928
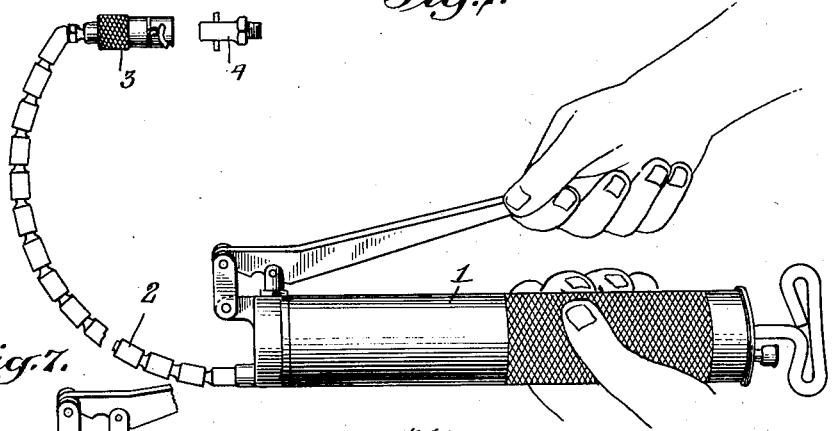
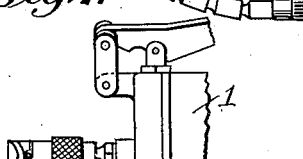
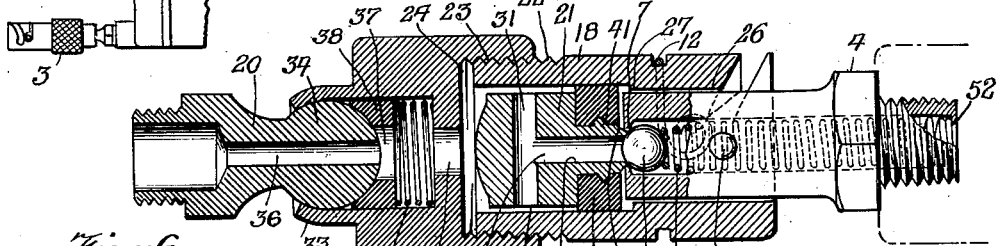
WITNESSES
INVENTORS
Jacob Muhlhauser
Daniel G. Adams
BY
ATTORNEY Patented Aug. 9, 1932

1,871,421

UNITED STATES PATENT OFFICE

JACOB MUHLHAUSER AND DANIEL G. ADAMS, OF NEW YORK, N. Y., ASSIGNORS TO ADAMS GREASE GUN CORPORATION, OF NEW YORK, N. Y., A CORPORATION OF NEW YORK

HIGH PRESSURE COUPLER

Application filed December 7, 1928. Serial No. 324,487.

This invention relates to an improved high pressure coupler for high pressure grease systems used on automobiles and other machinery, the object being to provide an improved construction capable of use with any kind of a pump or other high pressure device for forcing grease through a pipe line or tubular conductor to a desired point without leakage and with a minimum effort in connecting and disconnecting the parts.

Another object of the invention is to produce a high pressure coupler wherein the parts are formed so that the device may be quickly coupled and uncoupled and also to automatically act to provide a grease-tight seal while the grease is being forced through the coupler.

A further object of the invention, more specifically is to provide a high pressure coupler wherein a floating structure is arranged interiorly acting to present sealing means brought into sealing position by the pressure of the grease as the same is forced through the coupler.

In the accompanying drawing,—

Figure 1 is a side view partly in perspective showing a grease gun with a hose or tube extending therefrom and a coupler disclosing an embodiment of the invention applied thereto;

Figure 2 is a longitudinal vertical sectional view through the coupler shown in Figure 1;

Figure 3 is an enlarged side view of the coupler shown in Figure 1;

Figure 4 is a perspective view of one of the springs used by the coupler shown in Figure 1;

Figure 5 is a longitudinal vertical sectional view through a float showing a modified form to that illustrated in Figure 2;

Figure 6 is a view similar to Figure 5 but showing a further modified form of float and a stud fitting or coupling head;

Figure 7 is a fragmentary view showing one end of the grease gun illustrated in Figure 1 but with a modified method of connecting the coupler thereto;

Figure 8 is an enlarged fragmentary view showing the seat on the coupling head illustrated in Figure 2, together with part of the float coacting therewith;

Referring to the accompanying drawing by numerals, 1 is a grease gun of any desired kind provided with a tubular hose 2 carrying a coupler 3 embodying the invention. The hose 2 may be metal or other desired material and of any desired type, as the particular structure of the hose forms no part of the present invention except in combination. Associated with the coupler 3 is a stud fitting 4. As illustrated particularly in Figure 2, the fitting 4 is hollow and is provided with a spring 5 for normally holding the ball 6 against the turned-in portion or seat 7. The stud fitting 4 is also provided with a pair of studs 8 adapted to be accommodated by the respective slots 9 in the coupler 3. This arrangement of studs and slots presents what is commonly known as a bayonet joint or a bayonet connection. It will be noted from Figure 2 that the slots 9 are provided with a section 10 which extends backward so as to present a raised portion 11, whereby the coupler body or female coupling member cannot be moved out of engagement with the fitting 4 without a slight spiral motion to the left in order to cause the portion 11 to pass the stud 8. To prevent an accidental movement of this kind a spring 12 is provided. This spring is fitted into a groove 13 and is preferably held in place by small portions 14 being forced or pressed over part of the spring. The ends of the spring are formed into resilient eyes 15 and 16. These eyes are mounted to fit into suitable depressions or recesses 17 and are arranged to overlap the slot 9 so that the respective pins 8 cannot move out of the section 10 of the slots 9 without contracting the eyes 15 and 16. By this construction and arrangement of parts the coupler may be quickly interlocked with the fitting 4 and will remain in proper position regardless of whether the pump 1 is being used. This prevents accidental disengagement but permits ready engagement or disengagement at any time.

The coupler 3 is formed with a coupler body 18, a collar 19, a ball swivel 20 and a sealing device 21 known as a float. These different parts are so formed and associated as to automatically present a grease-tight connection when grease under pressure is being forced through the coupler. On the coupler body 18 there is provided a section of threads 22 which taper and which coact with the tapering thread section 23 in the bore 24 of the collar 19. By this structure a grease-tight connection may be readily provided and yet the parts may be taken apart whenever desired. The body 18 is also provided with a bore 25 merging into a bore 26, a shoulder 27 being provided at the juncture of the two bores. The bore 26 is designed to loosely receive the fitting 4, while the bore 25 is adapted to receive the float 21. When the parts are in operative position, as shown in Figure 2, the fitting 4 projects slightly into the bore 25 and the tapering end 28 presses against the ball 6 and tightly against the turned-in seat 7, whereby a grease-tight connection is provided. In addition to providing a grease-tight connection the construction above set forth presents a dirt-cutting circumferential edge, as shown in Figure 8, whereby the structure is self-cleaning. To provide a grease-tight connection between the float and the coupler body a washer 29 is mounted on the neck 30 of float 21, said neck being hollow and the passageway 32 of this hollow neck merging into the radial bore 31 so that grease passing from the bore 25 will pass around the rear part of float 21 through bore 31, through the hollow portion or passageway 32 to ball 6. As the grease flows the pressure thereof will move ball 6 away from or out of contact with the end 28 so that the grease will freely flow into the bore of fitting 4 and thence into the device receiving the grease. As the grease flows into the bore 25 it acts on the float 21 and forces the end 28 tightly against the in-turned seat 7, while the washer 29 fits rather tightly against the walls of bore 25 for preventing the passage of grease except through the passageway 32. The float 21 is freely movable back and forth in bore 25, but by reason of the tight fitting of the washer 29 the float usually stays at the point where it is left. By reason of this construction and arrangement of parts the pressure of the grease will determine the tightness of the fit between the float and the fitting 4. This arrangement, therefore, permits a tighter fit where a great pressure is used than where a slight pressure is used, and consequently, the coupler adapts itself automatically to any desired or applied pressure which may be used.

In forming the collar 19 the same is not only formed to be screwed tightly onto the coupler body 18, but to be provided with a rounded socket portion 33 adapted to receive the ball member 34 of the ball swivel 20. The ball swivel 20 is screwed onto the end of the tubular conduit 2 or secured thereto in some desirable way. The ball swivel 20 is provided with a passageway 36, which discharges into the passageway 37 of the washer 38 which is preferably of leather. A spring 39 acts to hold the washer 38 in tight contact with the ball 34 in order that there may always be a grease-tight connection between ball 34 and the socket 33. It will be understood that the grease naturally discharges into the spring around the spring 39 and thus fluid passing will consequently assist the spring in holding the washer 38 firmly in place. As the grease flows the same passes through the passageway 40 into the bore 24 and thence through the coupler, as heretofore described. It will be noted that the float 21 is formed with a neck 30, as heretofore set forth, and this neck is provided with a bead 41 over which the washer 29 is forced, whereby the washer is held firmly in place and provides a peripheral contact, while the portion 28 provides a metal contact against the metal seat or portion 7. It will thus be seen that in this form of the invention there is a metal-to-metal dirt cutting edge contact which is also true of the form shown in Figure 6, but which is not true of the form shown in Figure 5. In this latter form the washer 42 is fitted onto a neck 43 having a flange 44. The washer is forced over the flange 44 and presses tightly against the wall 45 but projects an appreciable distance beyond the outer end of neck 43, thus presenting a washer contact adapted to press against the end of the fitting 4 when the modified form of float 46 is being used, and also a peripheral seal.

In Figure 6 a further modified form of float 47 is shown. In this form of the invention a washer 48 is used for providing a peripheral contact, while the front of the float is provided with a recess 49 having an annular beveled section 50 adapted to engage the sharp dirt-cutting edge section 51 of the fitting 4. This construction presents a metal-to-metal dirt-cutting edge contact between the float and the fitting, said contact being at the periphery of the fitting, while the metal contact shown in Figure 2 is at the inlet or passageway of the fitting. In regard to the fitting 4 it will be noted that this is a tubular member having one end threaded so as to be screwed into a grease cup, bearing member or other part adapted to receive grease. The threaded end is formed with a turned-over portion 52 for confining the comparatively long spiral spring 5 which presses against the portion 52 and against the ball or closure 6 to normally maintain the closure against the seat 7. By reason of this construction a very long spring may be used and thereby a substantially constant pressure may be exerted on the closure 6.

What I claim is:—

1. A high pressure coupler, including a coupler body adapted to receive a fitting, said body being provided with an external tapering thread at one end, a collar having an internal tapering thread adapted to be screwed onto the first-mentioned tapering thread to provide a tight connection, means connected with the collar for connecting the collar with a source of liquid supply, and a grease actuated float arranged within said coupler body positioned to be moved by the fluid passing through the coupler body so that the float will press tightly against said fitting, said float having a T-shaped passageway extending therethrough in free communication at all times with the inlet and outlet of said coupler body.

2. The combination with a grease cup comprising a tubular member having at one end an inwardly-extending portion acting as a closure seat, a closure loosely positioned in said tubular member, a spring acting on said closure for normally seating the closure, a stud projecting from said tubular member, of a grease gun having a discharge conduit and means coacting with said stud for detachably connecting the discharge end of said conduit with said tubular member, said means including a freely sliding float adapted to be moved by grease pressure to a position against said seat whereby grease may be discharged into said tubular member without leakage, said float having a T-shaped passageway extending therethrough and positioned to be in continuous communication with the inlet and outlet of said means.

3. The combination with a grease cup comprising a tubular member having a closure seat, a closure, a stud extending from said tubular member and a spring fitted in said tubular member and extending substantially for the full length thereof, said spring acting on said closure for reseating the same, of a grease pump having a discharge conduit, and means coacting with said stud for detachably connecting the discharge end of said conduit with said tubular member, said means including a grease operated float loosely positioned opposite said seat and in the path of flow of the grease from said conduit to said seat, whereby the pressure of grease will force the float against said seat and thereby causing a sealing action, said float having a substantially T-shaped passageway extending therethrough and positioned to be in continuous communication with the inlet and outlet of said means.

4. The combination with an apparatus having a part to be lubricated, of a conduit conducting lubricant to said part, a coupler secured to one end of said conduit, and a grease gun connected with the opposite end of said conduit for forcing lubricant through said conduit and said coupler to the part to be lubricated, said coupler including a coupling head connected with the part to be lubricated and a coupling body disengageably connected with said coupling head, said coupling body being formed with a bore and a grease actuated sealing means slidably mounted in the bore and positioned to press against the end of said head when the coupling member is interlocked with said head and grease is flowing through the coupler, said grease acting to press said sealing means against the fitting, said sealing means having a passageway extending through, said passageway extending longitudinally from the sealing means on one end thereof to near the other end and then radially to the periphery so as to be continually in communication with the inlet and outlet of the fitting.

5. The combination with a grease gun having a conduit connected therewith, of a coupler coacting with the conduit, said coupler being formed in two major parts, one acting as a coupling head connected to the article to be lubricated and the other part connected to the conduit, said other part being formed with a coupler body adapted to interlock with said coupling head, said body having a bore, a sliding float moved by grease pressure, said float being arranged in said bore, said float being formed with a contact end adapted to contact with said coupling head and with passageways extending therethrough, said passageway extending from one end of the float to a periphery at a point spaced from the end, a washer carried by said contact end frictionally engaging the walls of said coupler body, and means for connecting said coupler body with said conduit.

6. A high pressure coupling, including a coupling head and a coupler body including a tubular member adapted to telescopically fit over part of the coupling head, means for causing the coupler body and the coupling head to interlock, a float mounted to freely reciprocate under the action of grease pressure in said coupler body, said float being provided with a discharge part adapted to press against said coupling head when the coupler is in use, said float having a passageway extending from the discharge end thereof to the periphery at a point spaced from said discharge end for guiding grease to said coupling head, said passageway being in continual communication with the grease supply, and means for disengageably connecting said coupler body with a supply of grease.

7. In a high pressure coupler, a coupler body formed with a tapering threaded section at one end, a collar having a socket provided with a tapering threaded portion adapted to be screwed onto the tapering threaded portion of the coupler body, whereby a grease-tight connection is secured, means connected with the collar for connecting the collar with a source of grease supply, a grease actuated float slidably mounted in said coupler body, and means for connecting the coupler body with the article to be supplied with grease, said means acting to hold the parts in position so that the pressure of grease passing through the coupler body will cause said float to function to seal the connecting means.

8. In a high pressure coupler, a grease actuated float having a substantially tubular body provided with a radial bore and a longitudinal bore extending from the radial bore to one end of the body, said body having a neck at one end, said longitudinal bore extending through said neck, said neck having an annular flange and a washer fitted over said flange and hugging said neck, said washer being thicker than the length of said neck and of greater diameter than said body.

9. A high pressure coupler, including a coupler body, a float slidably mounted therein and movable only under the pressure of the grease, said float having a body member formed with a longitudinal bore extending from one end to the opposite end but falling short of said opposite end, a radial bore extending from the side of said body member until it merges into the first mentioned bore, and an annular peripheral groove extending around said float body member and merging into said radial bore.

10. A high pressure coupler, including a coupler body provided with bayonet slots adapted to receive the projecting arms of a fitting, a float mounted in said coupler body and adapted to slide therein under the pressure of the grease, said float having a body member provided with a longitudinal bore extending from one end toward the opposite end but falling short of said opposite end, a radial bore extending from the side of said body member and merging into the first mentioned bore, and an annular peripheral groove extending around said float body member and merging into said radial bore.

11. A high pressure grease coupler including a coupler body, a sealing float arranged to slide in a coupler body and to be actuated by grease pressure, said float having a passageway extending therethrough from the discharge end to a point on the periphery, a collar screwed on said body, said collar having a passageway therethrough, said collar being adapted to receive grease supply, said passageway in said float being continuously in communication with the inlet and outlet of the coupler body, and means for causing said coupler body to interlock to an article to receive grease.

12. A high pressure coupler, including a coupler body having means adapted to interlock with an article to receive grease, a collar removably secured to said coupler body and having a passageway extending therethrough, said collar being adapted to receive grease from a supply, a sealing float slidably mounted in said coupler body and adapted to be actuated solely by the grease pressure, said float having a longitudinal passageway leading from one end thereof but not extending through said float and a radial passageway extending from one side of said float and connecting with said longitudinal passageway, the passageways in said float being continually in communication with said grease supply.

13. In a high pressure coupler, a coupler body and a float mounted in said coupler body and adapted to slide therein under the pressure of grease passing therethrough, said float having a body formed with a forwardly extending neck, a passageway extending through said neck, a rdial bore extending from said passageway to the periphery of the body, a washer removably positioned on said neck, said washer snugly fitting against the coupler body, and said coupler body being provided with an annular peripheral groove communicating with the radial bore in the said float, said groove being in continuous communication with a grease supply and with the passageway in said neck.

14. A high pressure coupler, including a coupler body and a coupler collar secured thereto, a grease actuated float mounted to reciprocate freely in said coupler body, said float having a float body formed with a bore extending from one end toward the opposite end but falling short of said opposite end, a radially extending bore merging into the first mentioned bore, said collar being provided with an annular peripheral groove merging into said radial bore, said groove and said radially extending bore being continually in communication with the interior of said coupler body, a partly counter-sunk washer carried by said float body near one end and means at the end of said float body adjacent said washer providing an inclined metal seal.

JACOB MUHLHAUSER.
DANIEL G. ADAMS.